United States Patent
Potter et al.

(10) Patent No.: US 9,016,721 B1
(45) Date of Patent: Apr. 28, 2015

(54) AIRBAG ASSEMBLIES WITH ADAPTIVE VENTING

(71) Applicant: Autoliv ASP, Inc., Ogden, UT (US)

(72) Inventors: Kent Potter, Brigham City, UT (US); Jeffrey D. Williams, Roy, UT (US); Patrick Jamison, North Ogden, UT (US); Ryan D. Nelson, Bear River City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/276,439

(22) Filed: May 13, 2014

(51) Int. Cl.
  *B60R 21/239* (2006.01)

(52) U.S. Cl.
  CPC ....... *B60R 21/239* (2013.01); *B60R 2021/2395* (2013.01)

(58) Field of Classification Search
  CPC ................. B60R 21/239; B60R 2021/2395
  USPC .......................................................... 280/739
  See application file for complete search history.

(56) References Cited

U.S. PATENT DOCUMENTS

| | | | |
|---|---|---|---|
| 5,205,583 A * | 4/1993 | Henseler et al. ........... | 280/743.1 |
| 6,419,267 B1 * | 7/2002 | Hashimoto et al. ........ | 280/743.1 |
| 6,554,313 B2 * | 4/2003 | Uchida ........................ | 280/729 |
| 7,695,003 B2 | 4/2010 | Feller et al. | |
| 7,850,200 B2 | 12/2010 | Zauritz et al. | |
| 7,988,188 B2 | 8/2011 | Zauritz et al. | |
| 8,215,668 B2 * | 7/2012 | Cho et al. ...................... | 280/736 |
| 2007/0273133 A1 * | 11/2007 | Zauritz et al. ................. | 280/742 |
| 2009/0014989 A1 * | 1/2009 | Henderson et al. ........ | 280/730.2 |
| 2009/0230663 A1 * | 9/2009 | Mills et al. .................... | 280/735 |
| 2011/0062692 A1 * | 3/2011 | Yamane ........................ | 280/739 |
| 2014/0125039 A1 * | 5/2014 | Abele et al. ................ | 280/730.1 |

* cited by examiner

*Primary Examiner* — Ruth Ilan
(74) *Attorney, Agent, or Firm* — R. Whitney Johnson; Stoel Rives LLP

(57) ABSTRACT

A front airbag assembly deployable from a steering wheel or instrument panel of a vehicle. The airbag assembly includes an airbag cushion and an outer panel that is coupled to the airbag cushion to form a channel. The venting capacity of some airbag assemblies can be modulated without input from an electrical sensor. In some circumstances, the venting capacity of the airbag assembly can vary based on whether and where a vehicle occupant strikes the outer panel of the airbag assembly.

22 Claims, 16 Drawing Sheets

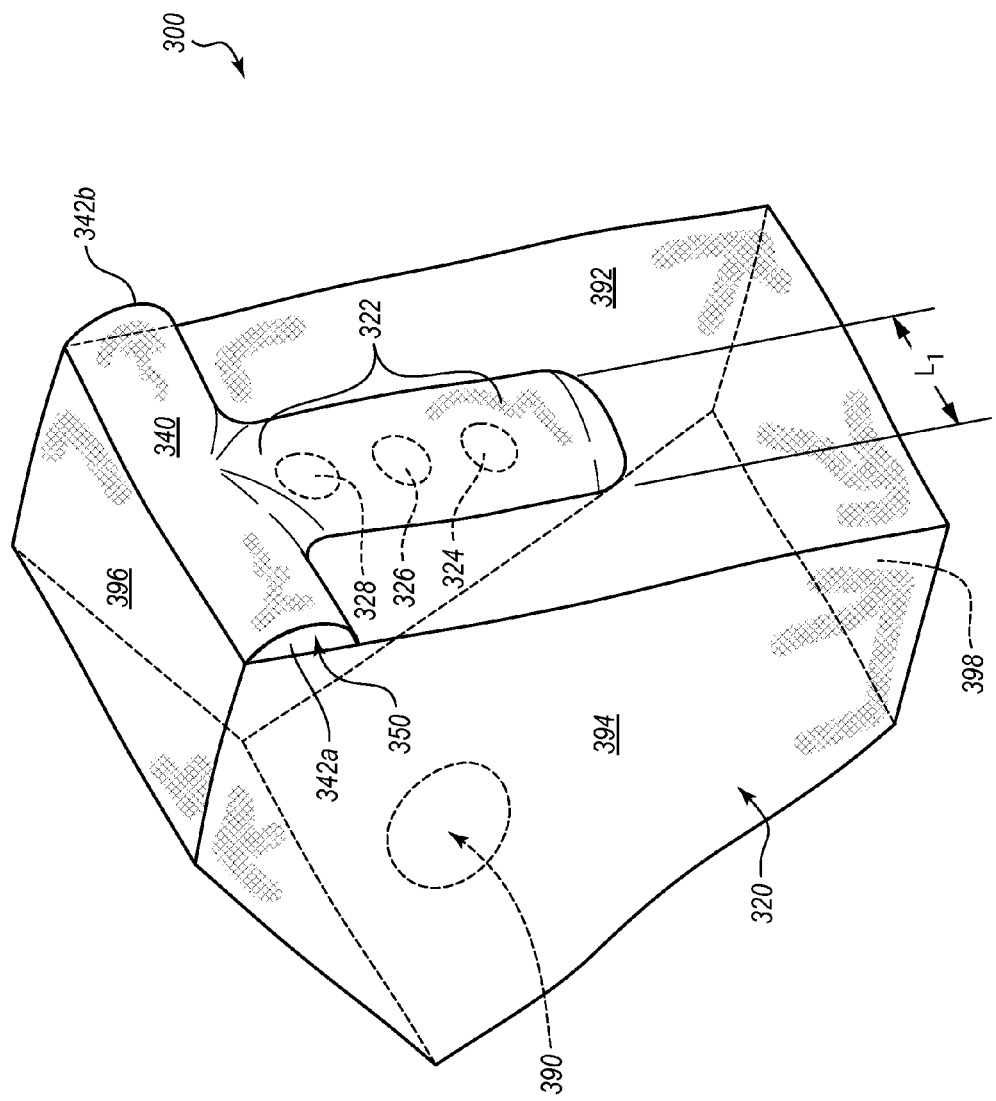

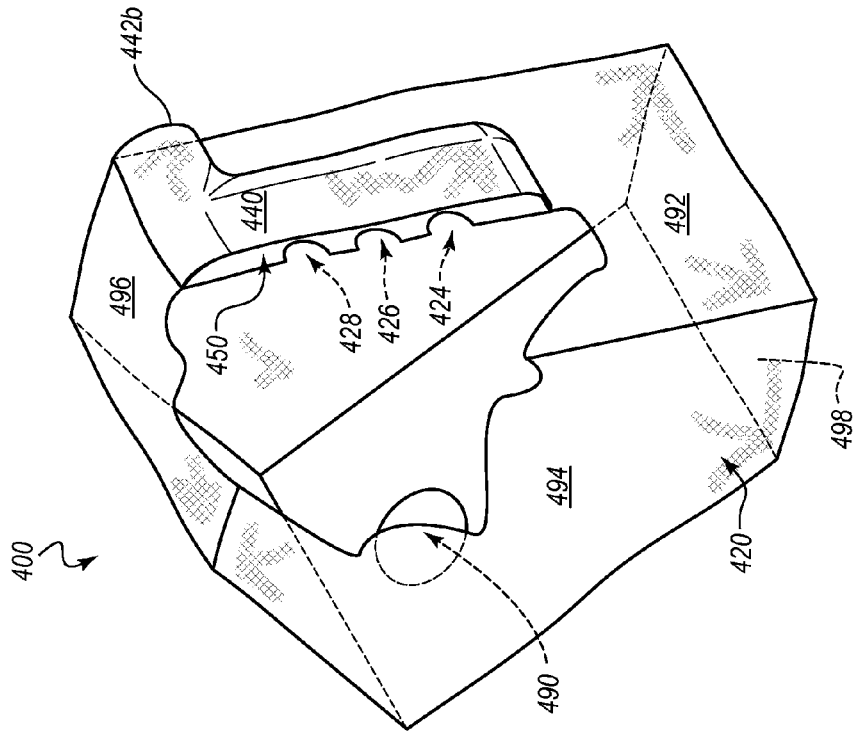
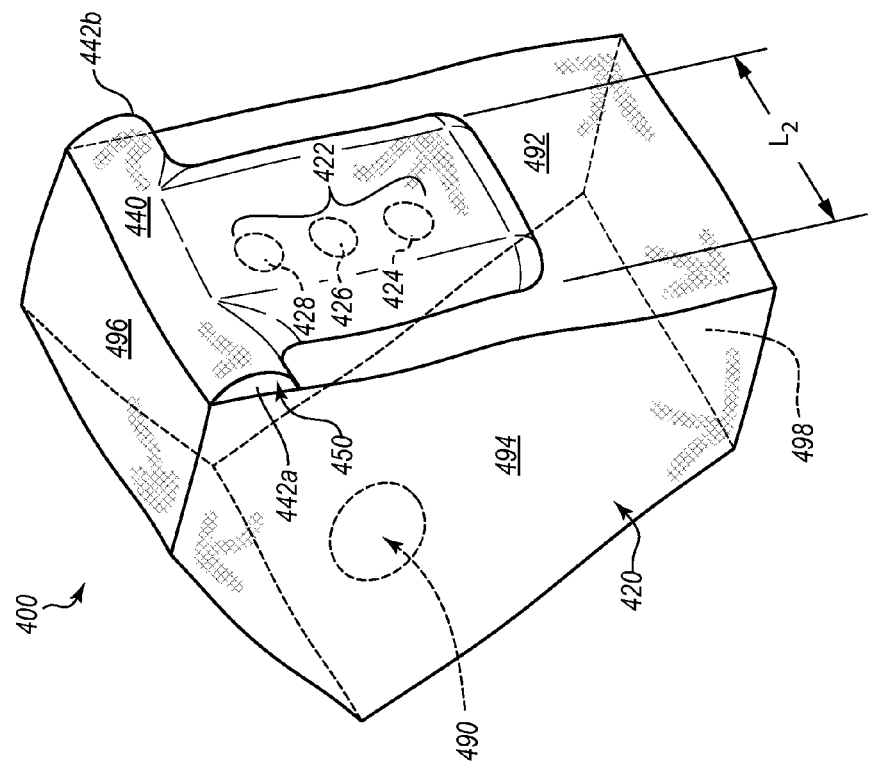

US 9,016,721 B1

AIRBAG ASSEMBLIES WITH ADAPTIVE VENTING

BACKGROUND

Inflatable airbags and related components may be mounted within a vehicle and deploy during a collision event. The deployed airbag may cushion an occupant and prevent detrimental impact with vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 5A is a perspective view of an airbag assembly, according to another embodiment.

FIG. 6A is a perspective view of an airbag assembly, according to another embodiment.

FIG. 6B is a partially cutaway perspective view of the airbag assembly of FIG. 6A.

DETAILED DESCRIPTION

Figure 1A:
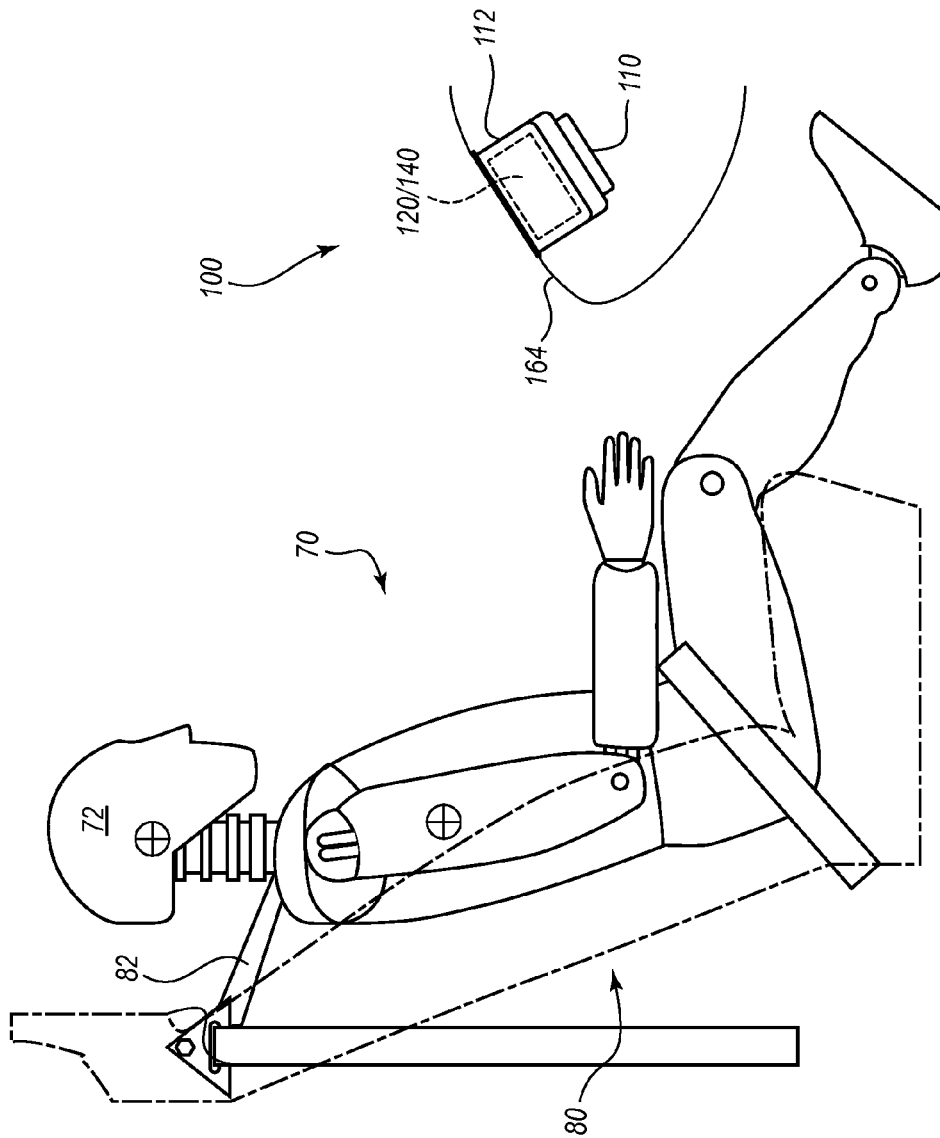
FIG. 1A is a partially cut-away side view of an airbag assembly, according to one embodiment, prior to deployment of the airbag assembly.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid, and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the rear of the vehicle. The terms left and right, unless otherwise specified, as used with reference to an occupant seated in a front seat of a vehicle. The term "front airbag" as used herein refers to a front driver airbag or a front passenger airbag (i.e., airbags that are configured to cushion the head of an occupant seated in the front driver seat or front passenger seat as the occupant moves in a primarily forward direction during a collision event). The term "occupant" refers to a person or crash test dummy seated in a front seat of a vehicle during a collision event.

Venting capacity refers to the degree to which potential flow paths out of an airbag cushion and into the external environment are not obstructed by an occupant's contact with an airbag assembly. For example, in an airbag assembly with high venting capacity, the vents and/or channels of an airbag assembly may be largely unobstructed by the occupant. In an airbag assembly with low venting capacity, the vents and/or channels may be obstructed to a greater degree due to an occupant's interaction with the airbag assembly.

Inflatable airbag assemblies and/or systems may be installed at various locations within a vehicle to reduce or minimize occupant injury during a collision event. For example, among other locations, airbag modules may be installed in steering wheels and/or dashboards. In the following disclosure, specific reference is made to airbag assemblies and components thereof to be deployed from a steering wheel system or dashboard, although the principles discussed herein may apply to airbags that are disposed at and/or deployable from other locations within a vehicle.

Airbags are typically installed within a housing in a packaged state (e.g., rolled, folded, or otherwise compressed) and may be retained in the packaged state behind a cover. During a collision event, an inflator may be triggered, which rapidly fills the airbag with inflation gas. The inflation gas may cause the airbag to rapidly transition from a compact packaged (i.e., undeployed) state to an expanded or deployed state. In some embodiments, the expanding airbag opens an airbag cover (e.g., by tearing through a burst seam or opening a door-like structure) to exit the housing. The inflator may be triggered by any suitable device or system, and the triggering may be in response to and/or influenced by one or more vehicle sensors.

During a collision event, one or more front airbags may deploy primarily toward an occupant seated in a front seat, such as the driver seat or the passenger seat. Such airbag cushions may be configured to receive the torso and/or head of an occupant during a collision event in which the occupant travels in a generally forward direction.

A front airbag assembly may include one or more vents. These vents may influence the air pressure within an airbag cushion during a collision event. For example, vents that are relatively inefficient at directing air out of an airbag cushion may provide increased resistance to occupants striking an airbag assembly. In other words, due to the relatively high pressure within the airbag cushion, an airbag cushion with relatively low venting capacity may exert a relatively high force on the occupant. Conversely, vents that allow for more efficient venting during a collision event may provide less resistance to an occupant's forward movement. In other words, due to the relatively low pressure within the airbag cushion, an airbag cushion with high venting capacity may exert a relatively low force on the occupant.

In general, the optimal degree of air pressure within an airbag cushion during a collision event depends on a number of factors, including the size of the occupant, and whether the occupant is secured by a seat belt. Thus, an airbag assembly that alters the air pressure profile within an airbag assembly during a collision event based on the size (e.g., height) of the occupant and/or whether the occupant is wearing a seat belt, may provide advantages over airbag assemblies that fail to take into account such considerations. Additionally or alternatively, airbag assemblies that provide such adaptive venting without using (1) multi-stage inflators and/or (2) input from one or more electrical sensors, may be more cost-effective than airbag assemblies that use multi-stage inflators and/or input from one or more electrical sensors.

Figure 1B:
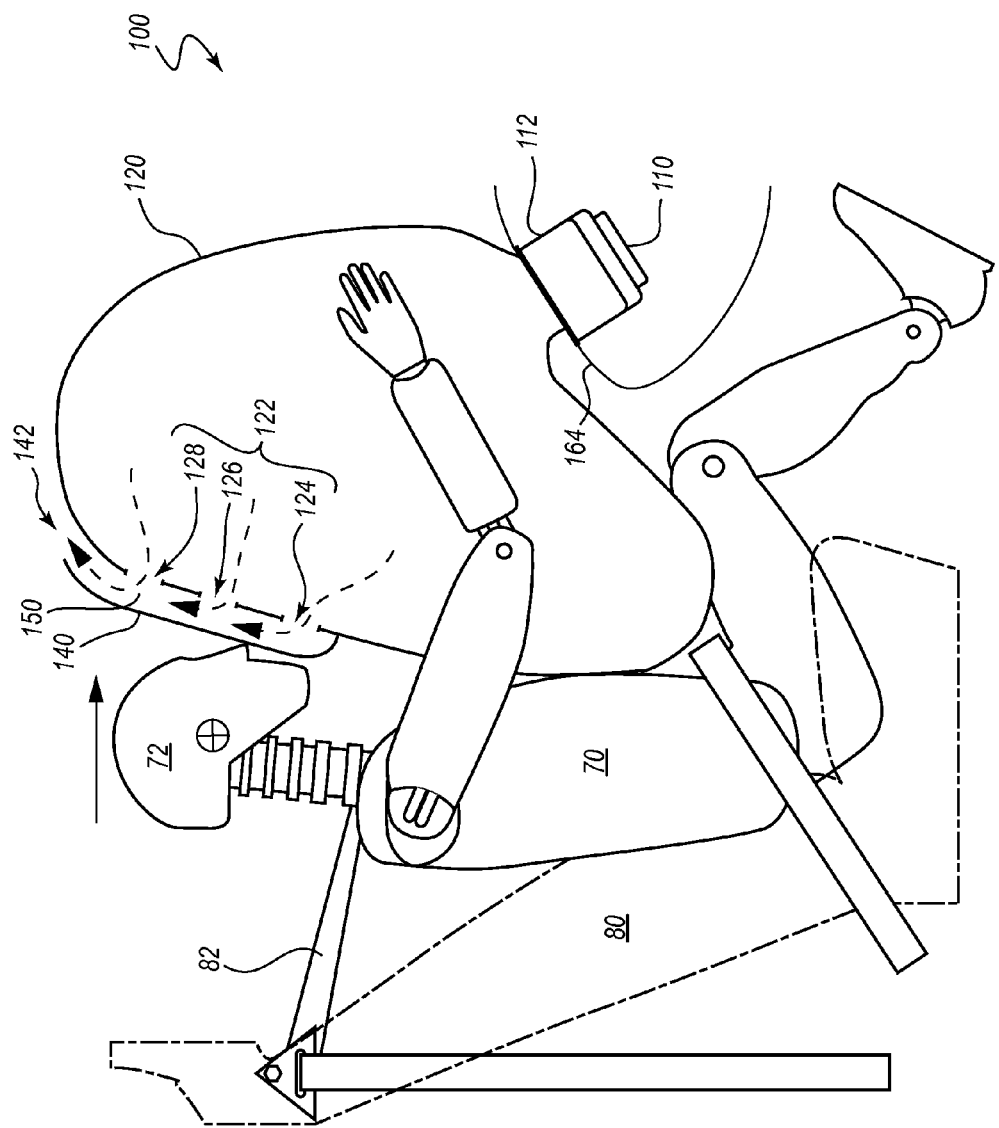
FIG. 1B is a partially cut-away side view of the airbag assembly of FIG. 1A at first time point after deployment.
Figure 1C:
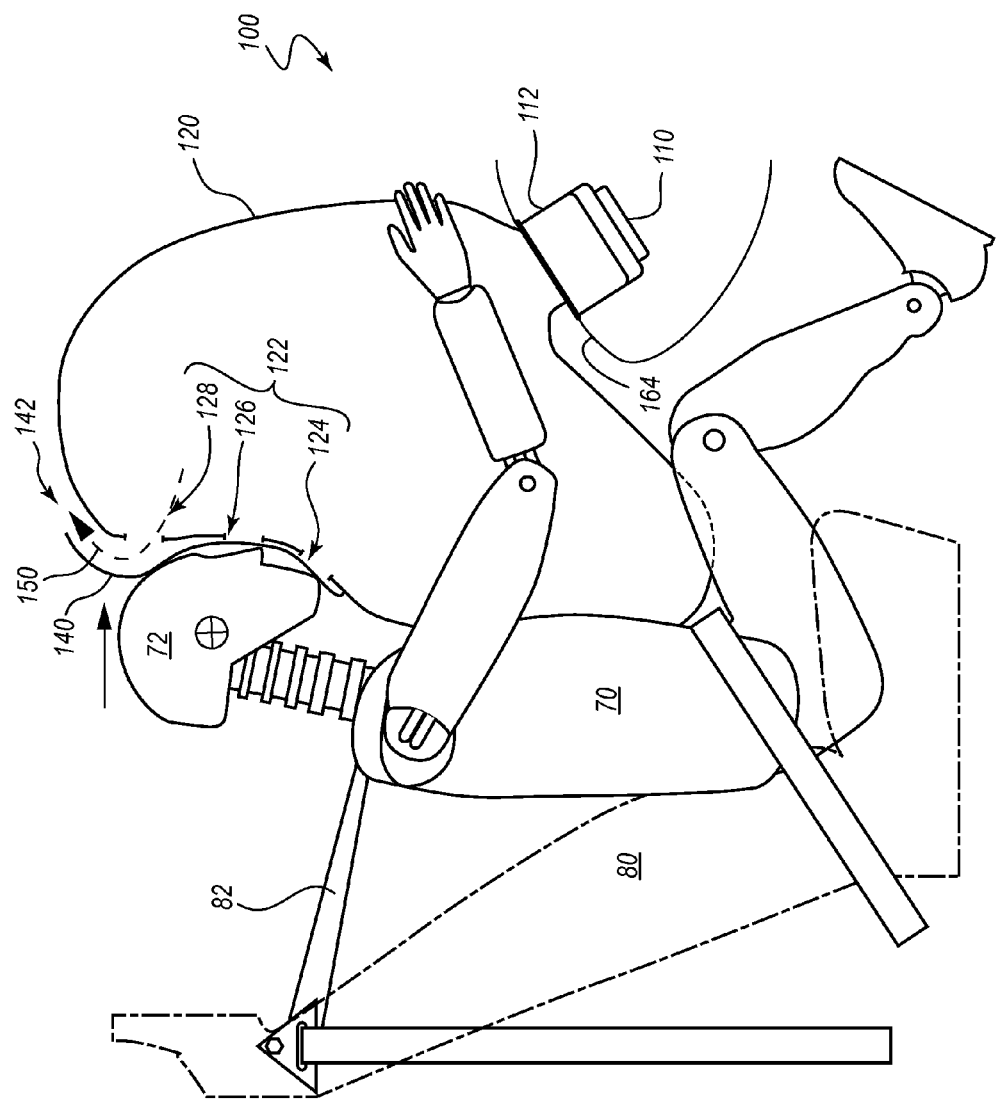
FIG. 1C is a partially cut-away side view of the airbag assembly of FIG. 1A at a second time point after deployment.

FIGS. 1A-1C provide side views of an occupant 70 and an at least partially cut-away airbag assembly 100 at various times relating to a collision event. More specifically, FIG. 1A provides a side view of an occupant and an airbag assembly 100 prior to deployment of the airbag assembly. FIG. 1B depicts the occupant 70 and airbag assembly 100 at a first time point after deployment while FIG. 1C depicts the occupant 70 and airbag assembly 100 at a second time point after deployment.

As depicted in these figures, the occupant 70 is seated and secured by a seat belt 82 in a front seat 80 of a vehicle. In some embodiments, the occupant 70 may be seated generally rearward of an airbag housing 112 that is coupled to and disposed within a dashboard 164. In other embodiments, the occupant to be cushioned by the airbag assembly may be seated rearward of a steering wheel system in which an airbag housing is disposed (e.g., in the front driver's seat).

The airbag assembly 100 may include an airbag cushion 120, an outer panel 140, an inflator 110, an airbag housing 112, or any other suitable combination of these (or other) components. The airbag cushion 120 may be configured to receive inflation gas from the inflator 110 to expand the airbag cushion 120 from a compact state to a deployed (i.e., expanded) state. For example, upon deployment, air from the inflator 110 may enter into the airbag cushion 120, causing the airbag cushion 120 to expand and exit from the dashboard 164 in a primarily rearward direction toward a front seat 80. The airbag cushion 120 may be shaped and dimensioned such that the airbag cushion 120, when fully deployed, covers a portion or region of the dashboard 164 or steering column. Deployment of the airbag assembly 100 may be triggered by one or more sensors that are coupled to the inflator 110. Triggering one or more sensors may, at least in part, actuate the inflator 110, causing the inflator 110 to fill the airbag cushion 120 with inflation gas. In some embodiments, the inflator 110 is a single-stage inflator.

The airbag cushion 120 may include one or more vents 122 configured to direct air out of the airbag cushion 120. For example, the airbag cushion 120 of FIG. 1B may include three vents: a lower vent 124, a middle vent 126, and an upper vent 128. The one or more vents 122 may include one or more holes, apertures, or valves that allow air to exit from the chamber formed by the airbag cushion 120. The vents 122 may be disposed in an occupant-facing side of the airbag cushion 120.

The outer panel 140 may be attached or otherwise coupled to the airbag cushion 120, for example on the occupant-facing side of the airbag cushion 120, overlapping the one or more vents 122. In other words, the outer panel 140 may be disposed between the occupant 70 and the vents 122 when the airbag cushion is in the deployed state. The outer panel 140 may be attached to the airbag cushion 120 with enough slack so that inflation gas (e.g., air) exiting from the airbag cushion 120 through the one or more vents 122 forces the outer panel 140 away from the one or more vents 122. The outer panel 140 may be attached to the airbag cushion 120 in a variety of ways. The attachment of the outer panel 140 to the airbag cushion 120 may form a channel 150 or a pocket or the like. For example, the channel 150 or the pocket may be defined, in whole or in part, by the outer panel 140 and the airbag cushion 120. The channel 150 or pocket may be configured to receive gas that is directed out of the airbag cushion 120 through the one or more vents 122 and direct the gas away from the one or more vents 122, through one or more openings 142, and into the cabin of a vehicle. The outer panel 140 may also be configured to direct the gas away from the occupant 70, for example, to reduce risk of injury such as burns to the occupant 70 due to the hot inflation gas. In one embodiment, the outer panel 140 may be generally U-shaped and may define a pocket or a channel 150 to direct inflation gas in an upward direction, similar to the channel depicted in FIGS. 8A and 8B. The channel 150 (or pocket), when formed, may be large enough (e.g., the outer panel 140 may be sufficiently slack) to allow uninhibited flow of inflation gases from the vents 122.

The outer panel 140 may be attached, or otherwise be coupled, to the airbag cushion 120 in any suitable manner, including but not limited to stitching, one or more adhesives, taping, welding (e.g., radio frequency welding), heat sealing, or any other suitable technique or combination of techniques.

As depicted in FIG. 1A, prior to deployment of the airbag assembly 100, the airbag cushion 120 and outer panel 140 may be disposed in a compact state (e.g., a rolled or folded state) within an airbag housing 112. The airbag housing 112 may be disposed within a portion of a dashboard 164 that is disposed in front of an occupant 70. In FIG. 1A, the occupant 70 may be seated in the passenger seat 80. In other embodiments, the occupant 70 may be seated in a driver seat.

FIG. 1B depicts the occupant 70 and airbag assembly 100 of FIG. 1A at a first time point during a deployment event. At the depicted time point, the occupant 70 has moved in a generally forward direction, and the airbag cushion 120 and outer panel 140 have deployed in a generally rearward direction. However, at this first time point, the head 72 of the occupant 70 has not yet contacted the airbag assembly 100. At this stage of deployment, the air pressure within the airbag cushion 120 is greater than the air pressure within the vehicle cabin. This air pressure differential causes inflation gas to exit from the airbag cushion 120 through one or more vents 122 of the airbag cushion 120. The gas exiting the one or more vents 122 forces the outer panel 140 away from the outer wall of the airbag cushion 120, forming a pocket defined by the outer panel 140 and the airbag cushion 120. In the illustrated embodiment, the pocket may be a channel 150. In other embodiments, the pocket may provide multiple openings from which air may escape away from the vents and/or an occupant. The illustrated channel 150 may direct inflation gas away from the one or more vents 122 and into the cabin of the vehicle. At this first time point, where an occupant's head 72 has not forced the outer panel 140 toward the airbag cushion 120 to narrow the channel 150, the airbag assembly 100 has full (or maximum) venting capacity. In other words, air from within the airbag cushion 120 may flow unimpeded through the one or more vents 122 (e.g., vents 124, 126, 128), enter into the channel 150, and exit through one or more openings 142 into the cabin of a vehicle.

FIG. 1C depicts the airbag assembly of FIG. 1A at a second time point that is subsequent to the first time point. At the depicted second time point, the head 72 of the occupant 70 has struck a portion of the deployed airbag assembly 100, thereby forcing the outer panel 140 toward two of the vents 124, 126 of the airbag cushion 120. By forcing the outer panel 140 toward two of the vents 124, 126, the outer panel 140 obstructs these vents 124, 126, thereby preventing or impeding fluid flow through them. Because the occupant's head strikes the airbag assembly 100 below the upper vent 128 at the second time point depicted in FIG. 1C, the upper vent 128 remains largely unobstructed.

At this second time point, because the outer panel 140 obstructs some of the pathways available for air to escape from the airbag cushion 120, the venting capacity of the airbag cushion 120 is diminished relative to the venting capacity of the airbag cushion 120 as depicted in FIG. 1B (i.e., immediately prior to impact). In other words, when the outer panel 140 obstructs one or more vents 122 as shown in FIG. 1C, the outer panel 140 may attenuate the rate of air flow out of the one or more vents 122. Thus, the attenuation of the rate of air flow out of one or more vents 122 during a collision event may be based on whether and where the front-seat occupant 70 strikes the outer panel 140.

Although the disclosure set forth in FIGS. 1A-1C spotlights the vents 124, 126, 128 that are covered by the outer panel 140, the airbag cushion 120 may additionally comprise other vents (not shown) that are not covered by the outer panel 140. For example, the airbag cushion 120 may comprise one or more discrete vents (i.e., vents that are always open), unidirectional vents, passive plug vents, slits, cinch tubes, etc. that are configured to (at least under some circumstances) allow air to escape from the airbag cushion and into the external environment, for example during ride down of an occupant.

Figure 2:
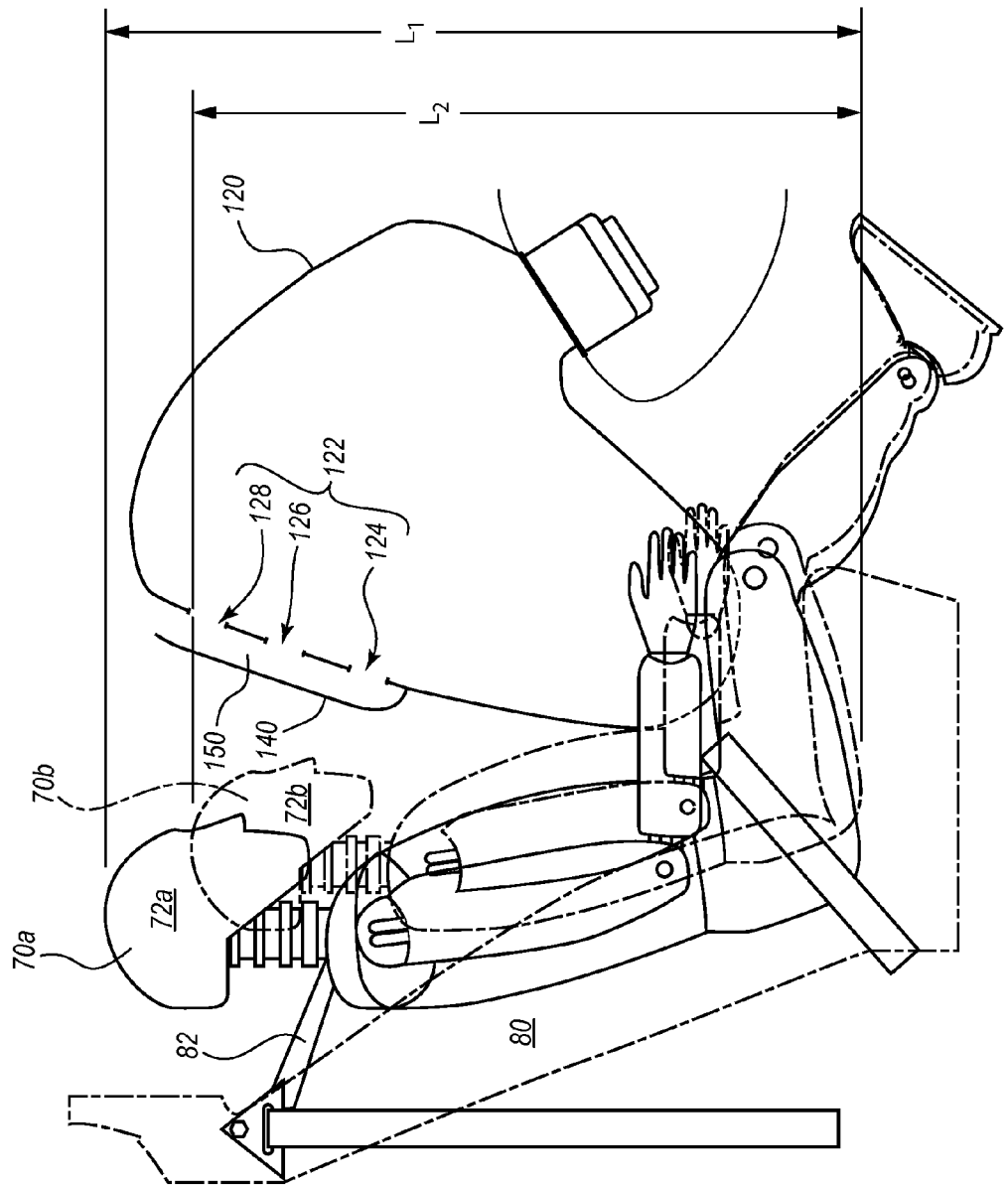
FIG. 2 is a partially cut-away side view of the airbag assembly of FIG. 1A, depicting alternate positions of a first occupant and a second occupant in a front seat.

FIG. 2 is a side view of the airbag assembly 100 of FIG. 1A, depicting alternate positions of a first occupant 70a and a second occupant 70b in the front seat. The first occupant 70a is depicted in solid lines, while the second occupant 70b is shown in phantom. As shown in this figure, the first and second occupants 70a, 70b may be differently sized. For example, the first occupant 70a may be taller, or otherwise larger than the second occupant 70b. More specifically, the head 72a of the first occupant 70a may be disposed at a higher level than the smaller occupant 70b when the first occupant 70a is in a seated position within the vehicle. For instance, the length $L_1$ between the surface of the front seat contacting the buttocks of a seated occupant and the top of the first occupant's head may be greater than the length $L_2$ between the same surface and the top of the second occupant's head.

A first occupant 70a seated in a front seat 80 may contact the deployed airbag assembly 100 at a higher level than a second occupant 70b would during the same collision event. For example, a relatively tall occupant 70a (e.g., a Hybrid III 50th Percentile Male Crash Test Dummy ("AM50 Dummy")) may strike a higher region of the airbag assembly than a relatively small occupant 70b (e.g., a Hybrid III 5th Percentile Female Crash Test Dummy ("AF05 Dummy")) during identical collision events.

The level at which an occupant 70a, 70b strikes the airbag assembly 100 may also be influenced by whether the occupant 70a, 70b is secured by a seat belt 82. For example, during some collision events, an occupant that is not secured by a seat belt may strike the airbag assembly 100 at a higher level than the occupant would if the occupant were properly restrained.

In many circumstances, it may be advantageous for an airbag assembly 100 to adapt its venting capacity based on one or more criteria. For example, occupants 70a, 70b moving with a relatively high energy or momentum may benefit from an airbag with a relatively low venting capacity because an airbag assembly 100 with a relatively low venting capacity provides a greater force to counteract the forward momentum and energy of the occupant 70a, 70b. Conversely, occupants 70a, 70b with a relatively low energy or momentum may benefit from an airbag assembly 100 with a relatively high venting capacity, as less resistance is needed to counteract their forward momentum and energy.

In many circumstances, an occupant with a relatively high forward momentum or energy tend to strike the airbag assembly at a higher location than an occupant with a relatively low forward momentum or energy. For example, a relatively tall occupant 70a, who may generally strike an airbag assembly at a higher region, may have greater forward momentum and energy during a collision event. This increased forward momentum and energy may be due to the tendency of a relatively tall occupant 70a to have more mass than relatively a short occupant 70b. Additionally, an unrestrained occupant, who may generally strike an airbag assembly 100 at a higher region, may have greater forward momentum and energy than a restrained occupant because no safety belt restricts the forward movement of an unrestrained occupant prior to contact with the airbag assembly.

An airbag assembly, such as the airbag assembly 100 depicted in FIGS. 1A-2, may provide adaptive venting based on whether and where the occupant strikes the airbag assembly 100. In other words, an airbag assembly 100 may have a higher venting capacity when an occupant 70 strikes a first (e.g., lower) region of an airbag than when an occupant 70 strikes a second (e.g., higher) region of an airbag assembly 100. In this manner, the airbag assembly 100 may have a modulated venting capacity. The modulated venting capacity may be accomplished regardless of whether the inflator is a single stage or a dual or multi-stage inflator. The modulated venting capacity may be accomplished with or without input from an electrical sensor.

For example, the first (e.g., taller) occupant 70a may contact a second region of the airbag assembly and force the outer panel 140 toward the airbag cushion 120, thereby obstructing the lower hole 124 and middle hole 126. In contrast, the second (e.g., shorter) occupant 70b may contact a first region and obstruct only the lower hole 124. Thus, the airbag assembly 100 may have a greater venting capacity when the smaller occupant 70b strikes the airbag assembly 100 than when the taller occupant 70a strikes the airbag assembly 100. Similarly, the airbag assembly 100 may provide increased venting capacity to a restrained occupant than to an unrestrained occupant because the restrained occupant may strike the airbag assembly 100 at a lower level than the unrestrained occupant.

FIGS. 3A-3D depict an embodiment of an airbag assembly 200 that resembles the airbag assembly 100 described above in certain respects. Accordingly, like features are designated with like reference numerals, with the leading digits incremented to "2." For example, the embodiment depicted in FIGS. 3A-3D includes an airbag cushion 220 that may, in some respects, resemble the airbag cushion 120 of FIGS. 1A-2. Relevant disclosure set forth above regarding similarly identified features thus may not be repeated hereafter. Moreover, specific features of the airbag assembly 100 and related components shown in FIGS. 1A-2 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIGS. 3A-3D. Any suitable combination of the features, and variations of the same, described with respect to the airbag assembly 100 and related components illustrated in FIGS. 1A-2, can be employed with the airbag assembly 200 and related components of FIGS. 3A-3D, and vice versa. This pattern of disclosure applies equally to further embodiments depicted in subsequent figures and described hereafter, wherein the leading digits may be further incremented.

FIGS. 3A-3D provide schematic views of an occupant's head 72 striking a front portion of an airbag assembly 200 at various locations. As depicted in these figures, the airbag assembly 200 may include an airbag cushion 220 and an outer panel 240. The airbag cushion 220 may include one or more vents 222 (e.g., vertically aligned vents) configured to direct inflation gas from the airbag cushion 220 into a channel or pocket that directs the inflation gas away from the one or more vents 222, through one or more openings 242a, 242b and into the cabin of a vehicle.

Figure 3:
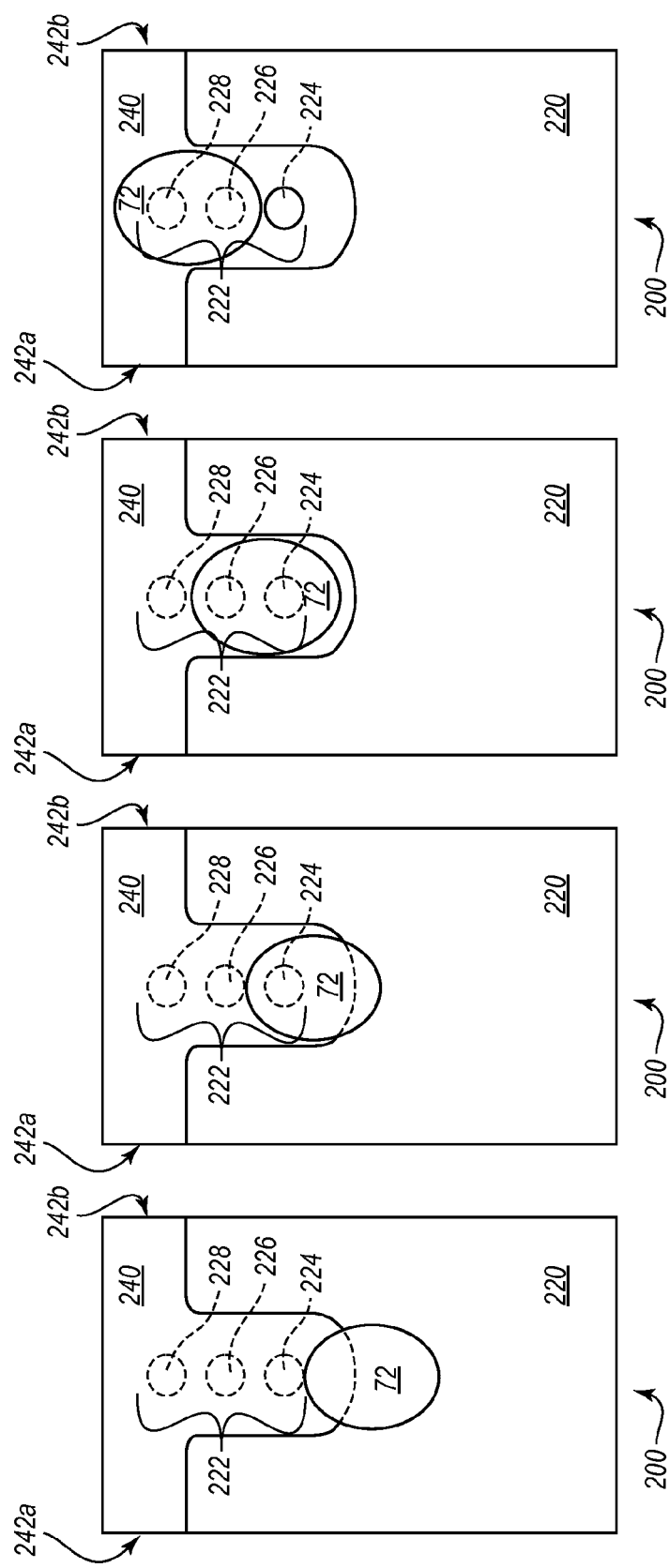
FIG. 3A is a schematic view of an occupant's head striking a first region of an airbag assembly.
FIG. 3B is a schematic view of an occupant's head striking a second region of the airbag assembly of FIG. 3A.
FIG. 3C is a schematic view of an occupant's head striking a third region of the airbag assembly of FIG. 3A.
FIG. 3D is a schematic view of an occupant's head striking a fourth region of the airbag assembly of FIG. 3A.

As depicted in FIG. 3A, an occupant's head 72 may strike a first region (e.g., lower region) of an airbag assembly 200. As shown in this figure, the first region may be disposed below the one or more vents 222. Because the occupant's head 72 strikes below the one or more vents 222, the air from the airbag cushion 220 is largely free to pass through the vents 222. The air may then enter into a channel or pocket formed by the outer panel 240 and the outer surface of the airbag cushion 220 and subsequently exit through one or more openings 242a, 242b. Thus, the airbag assembly 200 as depicted in FIG. 3A has (is in a state of) relatively high venting capacity.

FIG. 3B depicts an occupant striking the airbag assembly 200 at a second region that is higher than the first region described in connection with FIG. 3A. As shown in FIG. 3B, occupant contact at the second region may completely cover a lower vent 224. When an occupant's head 72 strikes the second region, the occupant's head 72 may force the outer panel 240 towards a lower vent 224 and thereby obstruct the passage of air through the lower vent 224. Such obstruction decreases the venting capacity of the airbag assembly 200 relative to when the vents 222 are unobstructed (e.g., the airbag assembly 200 as depicted in FIG. 3A).

FIG. 3C depicts an occupant's head 72 striking the airbag assembly 200 at a third region that is higher than the second region described in connection with FIG. 3B. As shown in FIG. 3C, occupant contact at the third region may completely cover a lower vent 224 and a middle vent 226. When an occupant's head 72 strikes the third region, the occupant's head 72 may force the outer panel 240 toward these two vents 224, 226 and thereby obstruct the passage of air through them. Such obstruction decreases the venting capacity of the airbag assembly 100 relative to when the vents 222 are obstructed to a lesser extent (e.g., the airbag assembly 200 as depicted in FIGS. 3A and 3B).

FIG. 3D depicts an occupant's head 72 striking the airbag assembly 200 at a fourth region that is higher than the third region described in connection with FIG. 3C. As shown in FIG. 3D, occupant contact at the fourth region may completely cover an upper vent 228 and a middle vent 226. By striking the fourth region, the occupant's head 72 may force the outer panel 240 toward these two vents 226, 228 and thereby obstruct the passage of air through them. Such obstruction decreases the venting capacity of the airbag assembly 200 relative to airbag assemblies in which the vents 222 are obstructed to a lesser extent (e.g., the airbag assemblies of FIGS. 3A and 3B). Moreover, even though an occupant's head 72, when striking the fourth region, may directly obstruct the same number of vents (and to the same extent) as when the occupant's head 72 strikes the third region, collisions in which the occupant's head 72 strikes the fourth (e.g., higher) region may nevertheless provide decreased venting capacity relative to collisions in which the occupant's head 72 strikes the third region. The outer panel 240 may also be forced toward and obstruct the lower vent 224. In other words, occupant contact at the fourth region may still prevent a channel from forming to allow a path for inflation gases to escape the airbag cushion 220. Alternatively or in addition, such decreased venting capacity may be due, at least in part, to the fact that air entering the channel through hole 224 when the occupant's head 72 strikes the fourth region, may need to follow a longer and/or more obstructed path to exit from the one or more openings 242a, 242b than air entering the channel through vent 228 when the occupant's head 72 strikes the third region (e.g., as shown in FIG. 3C). Similarly, the flow rate of air out of an airbag assembly 200 may be attenuated to a greater extent when an occupant strikes a higher region of the outer panel 240 than when the occupant strikes a lower region of the outer panel 240.

An ordinarily skilled artisan can appreciate that an occupant may strike an airbag assembly at positions intermediate of those depicted in FIGS. 3A-3D. For example, during some collision events, an occupant's head may strike a region that only partially covers one or more vents. Such partial coverage may obstruct fluid flow through the vent to a lesser extent than when the vents are fully covered.

Further, although the vent outer panel 240 depicted in FIGS. 3A-3D is T-shaped to direct air toward the sides of the airbag assembly, an ordinarily skilled artisan can appreciate that other embodiments may comprise an outer panel that forms a channel to direct air in an upward direction. In other embodiments, the outer panel forms a pocket. In short, the outer panel 240 may be configured a variety of ways to direct inflation gases away from the vents and/or away from the occupant.

An ordinarily skilled artisan can also appreciate that the number, distribution, and size of vents in an airbag cushion may be varied. For example, in some embodiments, an airbag assembly may include a first set of vents disposed below a horizontal plane and a second set of vents disposed above the horizontal plane. The first set of vents may differ in number and/or size from the second set of vents. Additionally one or more of the first set of vents and the second set of vents may include a plurality of horizontally aligned vents. For example, in some embodiments, the airbag cushion may include three horizontally aligned lower vents, two horizontally aligned middle vents, and one upper vent. In other embodiments, the airbag cushion may include three horizontally aligned upper vents, two horizontally aligned middle vents, and one lower vent. In other or further embodiments, the airbag cushion includes an array of horizontally and/or vertically aligned vents.

Additionally or alternatively, one or more vents may be disposed directly in front of a front-seat occupant such that an occupant moving in a forward direction would strike the one or more vents. In other or further embodiments, one or more vents may be disposed to the right or left of a front seat occupant such that the occupant would typically strike the such vents only when the occupant moves laterally to some extent during the collision event (e.g., during an oblique crash condition).

Figure 4:
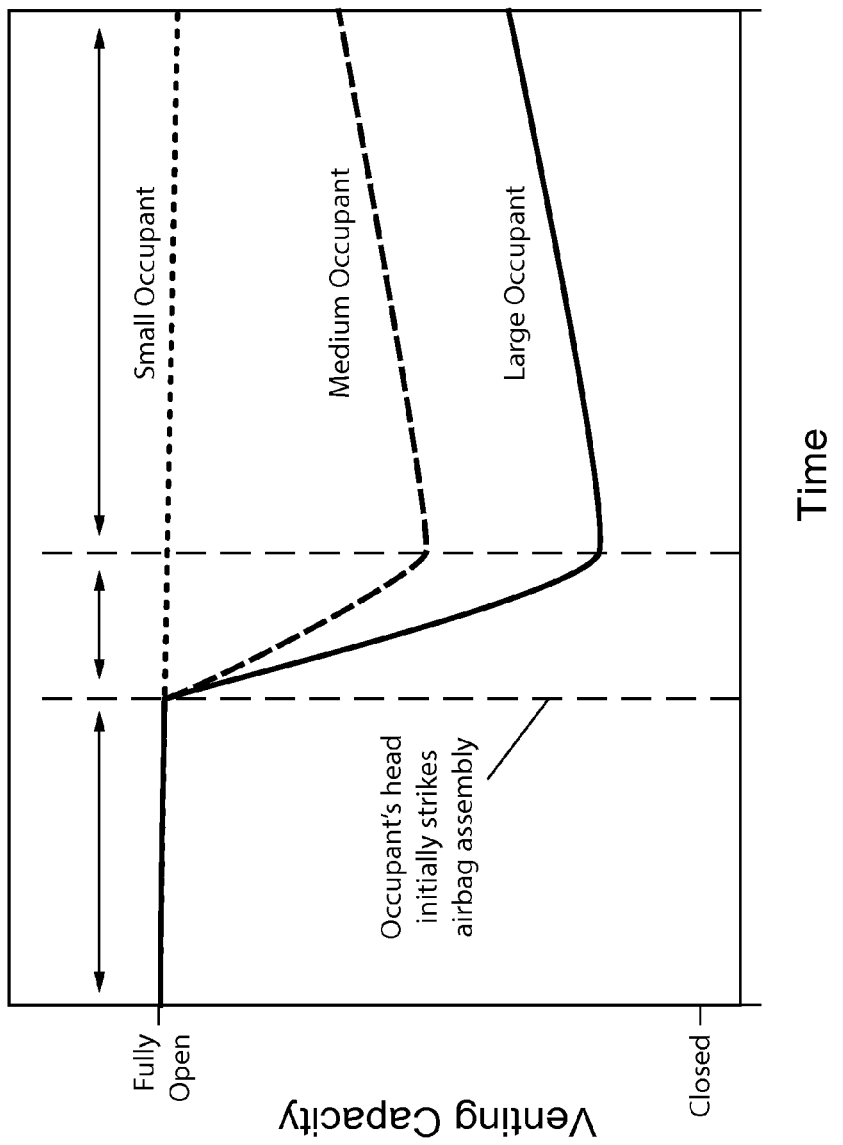
FIG. 4 is a graphical depiction of the variation of venting capacity across time during a collision event.

FIG. 4 is a schematic graph of a representative collision event that plots the venting capacity of an airbag assembly during a deployment event as a function of time. More particularly, the graph provided in FIG. 4 shows three distinct temporal stages during a collision event: (1) from actuation of the airbag inflator to an occupant's initial contact with the airbag assembly, (2) from the occupant's initial contact with the airbag assembly to the occupant's maximum obstruction of one or more vents and/or channels, (3) occupant's continued obstruction of one or more vents and/or channels during occupant ride down. This schematic graph is meant to illustrate, in a general way, changes that may occur in venting capacity across time during a collision event.

During the first temporal stage, spanning the time from actuation of the airbag inflator to the occupant's initial contact with the airbag assembly, the vents and channels of the airbag assembly may be unobstructed. In other words, although airbag assembly components (e.g., an airbag cushion, outer panel, etc.) may initially be in a compact state, no force generated by the occupant prevents air from passing through the one or more vents or channels.

During the second temporal stage, spanning the time from the occupant's initial contact with the airbag assembly to the occupant's maximum obstruction of the one or more vents and/or channels, the venting capacity of the airbag may decrease. For example, as the occupant makes initial contact with an outer panel of the airbag assembly, the occupant may begin to force the outer panel toward the one or more vents of the airbag cushion. As the outer panel is pushed toward one or more vents (and subsequently pushes the vents of the airbag assembly in a forward direction), airflow through the vents may progressively decrease, thus diminishing venting capacity.

During the third temporal stage, an occupant may continue to at least partially obstruct one or more vents during occupant ride down. During the later stages of a collision event, two separate mechanism may cause the venting capacity of the airbag to begin to increase. First, the occupant may, due in part to the restraining effect of the seat belt and/or airbag assembly, rebound back toward his or her seat. Second, inflation gas within the airbag may dissipate into the cabin of the vehicle, causing the airbag cushion to deflate to some extent. Either of these two mechanisms (or a combination of both mechanisms) may decrease the extent to which an airbag cushion vent is obstructed during a collision event, thereby gradually increasing venting capacity slightly.

As shown in FIG. 4, the venting capacity of the airbag cushion during a collision event may also vary based on the size of the occupant. For example, a large occupant may obstruct the vents covered by the outer panel to a greater extent than a medium-sized occupant and a small occupant, thereby lowering the venting capacity of the airbag assembly to a greater degree than the medium-sized occupant or the small occupant would under identical collision conditions. Under identical collision conditions, a medium-sized occupant may obstruct the vents to a lesser extent than the large occupant and to a greater extent than the small occupant, thus decreasing the venting capacity during a collision event to an intermediate level. A small occupant may fail to engage with the outer panel and the vents disposed under the outer panel. Due to the small occupant's failure to obstruct the vents, the venting capacity of the airbag cushion may remain unchanged throughout a collision event. Similar variation in venting capacity may be affected by whether the occupant was secured by a safety belt and the nature of the collision (e.g., whether the collision was head-on, oblique, etc.).

Figure 5B:
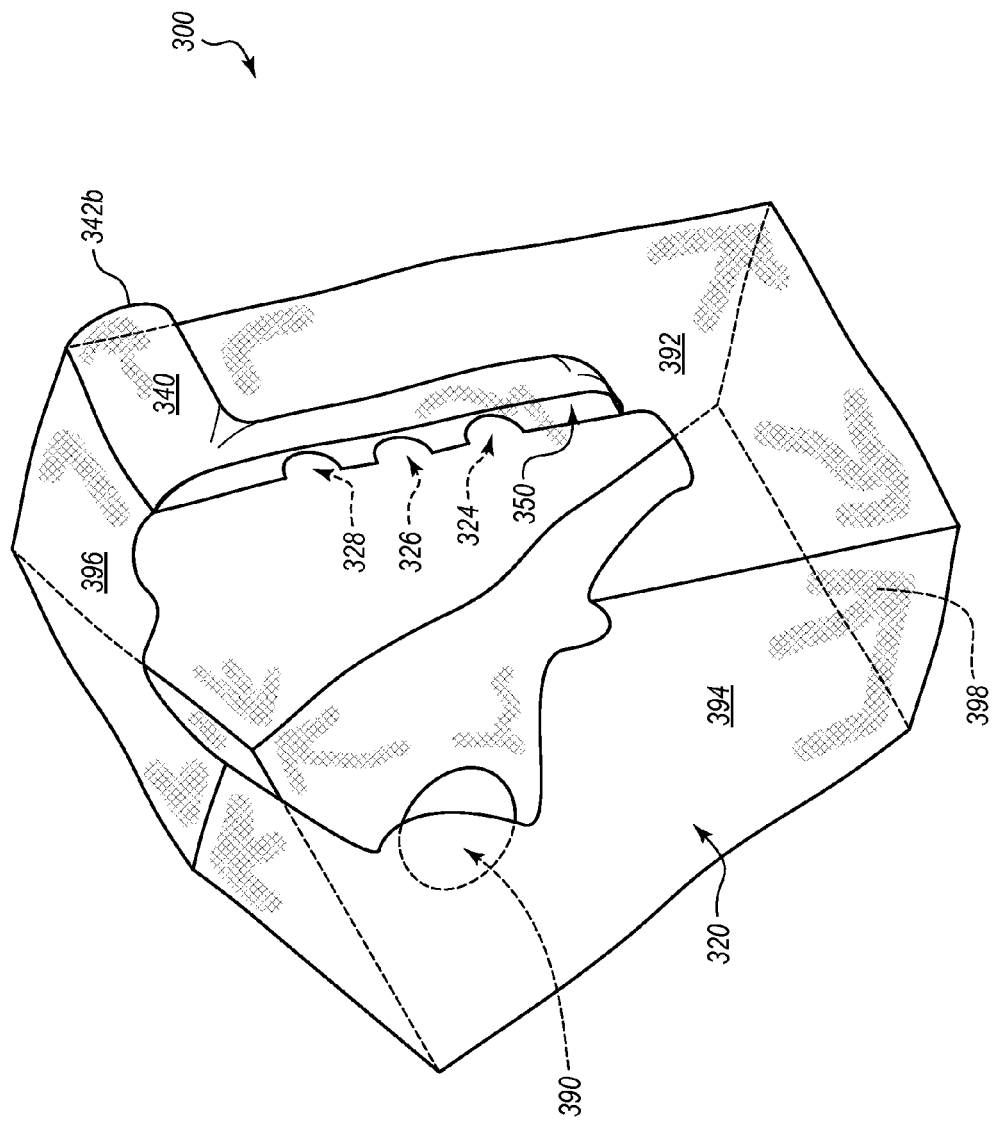
FIG. 5B is a partially cutaway perspective view of the airbag assembly of FIG. 5A.

FIG. 5A provides a perspective view of an inflated airbag assembly 300, according to another embodiment. FIG. 5B is a partially cut-away perspective view of the inflated airbag assembly 300 of FIG. 5A. With reference to both FIG. 5A and FIG. 5B, an airbag assembly 300 may include an airbag cushion 320 and an outer panel 340.

The airbag cushion 320 may include any suitable shape or configuration and may be manufactured in any suitable manner. In the illustrated embodiment, the airbag cushion 320 include a rearward-facing panel 392, side panels 394, an upper panel 396, a lower panel 398 and a throat 390. The throat 390 of the airbag cushion 320 may be configured to couple to an airbag housing and/or inflator disposed within a steering wheel assembly or dashboard. The throat 390 may include a hole through which inflation gas may pass to inflate the airbag cushion 320.

When the airbag cushion 320 is deployed, the rearward-facing panel 392 may include a rearward-facing surface. The surface may include the one or more vents 322. In the embodiment depicted in FIGS. 5A and 5B, the one or more panels, 392, 394, 396, 398 are each joined to one or more other panels 392, 394, 396, 398 along a seam. Such seams may be of any suitable variety, whether sealed or unsealed seams, and may be formed via stitching, one or more adhesives, taping, welding (e.g., radio frequency welding), heat sealing, or any other suitable technique or combination of techniques. In other or further embodiments, one or more panels may be seamlessly connected. For example, in some embodiments, the rearward facing panel may be integrally formed with one or more other panels.

Panels of an airbag assembly or airbag cushion may be formed of any suitable material. For example, in some embodiments, panels are formed of woven nylon fabric. Moreover, a variety of types and configurations of airbag panels can be utilized in various embodiments, For example, the size, shape, proportions, and connectivity of the panels may vary in different embodiments. Some embodiments may be tailored for use in different vehicles and/or for different locations within a vehicle.

In the inflated state, the airbag cushion 320 and outer panel 340 may define, in whole or in part, a channel 350. When the one or more vents 322 are unobstructed, air from within the airbag cushion 320 may pass through the one or more vents 322 into the channel 350. The channel 350 may be shaped and dimensioned to direct inflation gas away from the vents 322 and/or an occupant's face and to exit from one or more openings 342a, 342b during a collision event.

An outer panel 340 may be attached, or otherwise be coupled, to a front panel 392 of airbag cushion 320 in any suitable manner, including but not limited to stitching, one or more adhesives, taping, welding (e.g., radio frequency welding), heat sealing, or any other suitable technique or combination of techniques. As depicted in FIGS. 5A and 5B, the outer panel 340 and/or channel 350 may be generally T-shaped. For example, a generally T-shaped outer panel 340 may be attached to the airbag cushion 320 with enough slack such that the outer panel 340 and outer surface of the airbag cushion 320 form the channel 350 to allow inflation gas to be directed away from the vents 322 and occupant during deployment. In some embodiments, the channel 350 formed during deployment may be generally cylindania-shaped. In other words, as depicted in FIGS. 5A and 5B, the vertical portion and the horizontal portion of the T may include a cross-section that is approximately half-circular or trough-like in shape.

In some embodiments, the vertical portion of the T may be aligned with the one or more vents 322 of the airbag cushion 320. The width of the vertical portion of the T may include a length $L_1$. Length $L_1$ may be dimensioned to cover the one or more vents 324, 326, 328 and allow for the formation of a large enough channel to provide adequate venting. The horizontal portion of the T may include one or more openings 342a, 342b on either end of the horizontal portion to direct inflation gas away from the occupant and into the cabin of the vehicle.

FIGS. 6A and 6B depict an airbag assembly 400 that resembles the airbag assembly 300 in many respects. The airbag assembly 400 may include an airbag cushion 420 and an outer panel 440 covering one or more vents 422 (e.g., a lower vent 424, a middle vent 426, and an upper vent 428). The airbag cushion 420 may be constructed with a rearward-facing panel 492, side panels 494, an upper panel 496, and a lower panel 498, and may include a throat 490. The outer panel 440 may be configured to form a T-shaped channel 450 to direct gas toward openings 442a, 442b. Notably, however, the vertical portions of the T-shaped outer panel 440 and channel 450 include a width $L_2$ that is greater than the width $L_1$ of the embodiment depicted in FIGS. 5A and 5B. An outer panel and/or channel that has a relatively large width (e.g., $L_2$) may more readily accommodate (e.g., cover) vents that are not vertically aligned (e.g., horizontally aligned vents) and/or allow for the placement of wider vents than an outer panel and/or channel that comprise a relatively small width (e.g., $L_1$). For example, in an embodiment comprising an outer panel and channel with a relatively large width, the outer panel may be dimensioned to cover multiple horizontally aligned vents that together comprise an area that is equivalent to the area of one of the vents depicted in FIGS. 6A and 6B. Airbag assemblies comprising an outer panel with a relatively large width may allow vents to extend or be positioned laterally to a greater extent than airbag assemblies comprising outer panels with a relatively small width. Embodiments comprising outer panels with a relatively long width and with vents disposed or arranged laterally to some extent may provide adaptive venting to an occupant during oblique collision conditions.

An ordinarily skilled artisan can recognize that an outer panel and/or channel may be shaped and dimensioned in a wide variety of different configurations to direct inflation gas away from vents and/or an occupant's head during a collision event. For example, FIGS. 7A-7D provide a front view of an airbag cushion 520 that is attached to a variety of different outer panels 540a-540d.

Figure 7D:
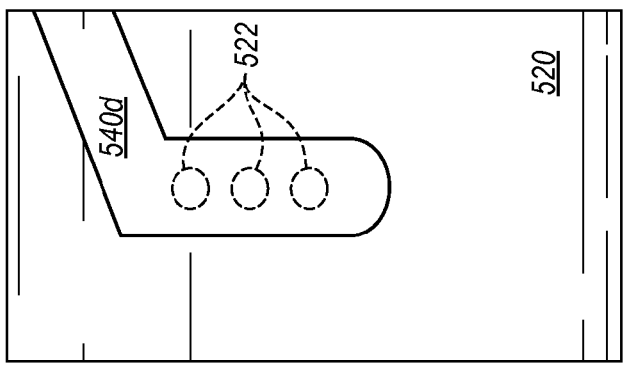
FIG. 7D is a front view of the airbag cushion of FIG. 7A and an outer panel shaped to direct inflation air in an upward and lateral direction.
Figure 7C:
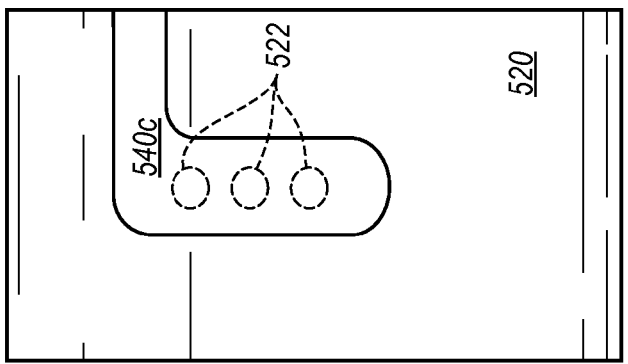
FIG. 7C is a front view of the airbag cushion, according to another embodiment, including an outer panel shaped to direct inflation air toward the right of the airbag cushion.
Figure 7B:
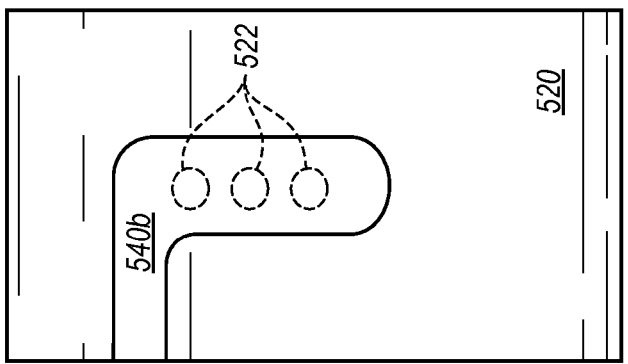
FIG. 7B is a front view of the airbag cushion, according to another embodiment, including an outer panel shaped to direct inflation air toward the left of the airbag cushion.
Figure 7A:
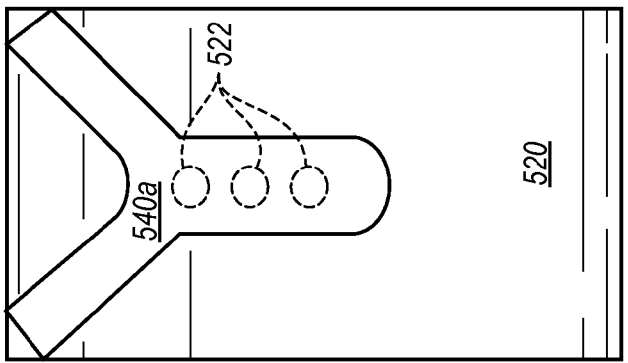
FIG. 7A is a front view of an airbag cushion, according to another embodiment, including a Y-shaped outer panel.

As depicted in FIG. 7A, the outer panel 540a may be generally Y-shaped. In some embodiments, the vertical portion of a Y-shaped outer panel may be aligned with one or more vents 522 of an airbag cushion 520. Air venting out through the one or more vents 522 may be directed away from the one or more vents 522 through diagonally extending arms of the Y-shaped channel and into the external environment.

FIG. 7B depicts an alternative outer panel 540b that is shaped differently from the outer panel 540a of FIG. 7A. More particularly, the outer panel 540b may include a vertical portion that may be vertically aligned with one or more vents 522 and a horizontal portion that extends in a leftward direction from the top of the vertical portion. An outer panel 540a shaped and dimensioned in this manner may direct air to the left of an occupant during a collision event.

FIG. 7C depicts an alternative outer panel 540c that is shaped differently from the outer panels 540a and 540b of FIGS. 7A and 7B. More particularly, the outer panel 540c may include a vertical portion that may be disposed to cover one or more vents 522 and a horizontal portion that extends in a rightward direction from the top of the vertical portion. An outer panel 540c shaped and dimensioned in this manner may direct air to the right of an occupant during a collision event.

FIG. 7D depicts an alternative outer panel 540d that is shaped differently from the outer panels 540a, 540b, and 540c of FIGS. 7A-70. More particularly, the outer panel 540d includes a vertical portion that may be aligned with one or more vents 522 and a diagonal portion that extends in an upward and lateral direction from the top of the vertical portion. An outer panel 540d shaped and dimensioned in this manner may direct inflation gas in an upward and lateral direction away from the occupant during a collision event.

Figure 8B:
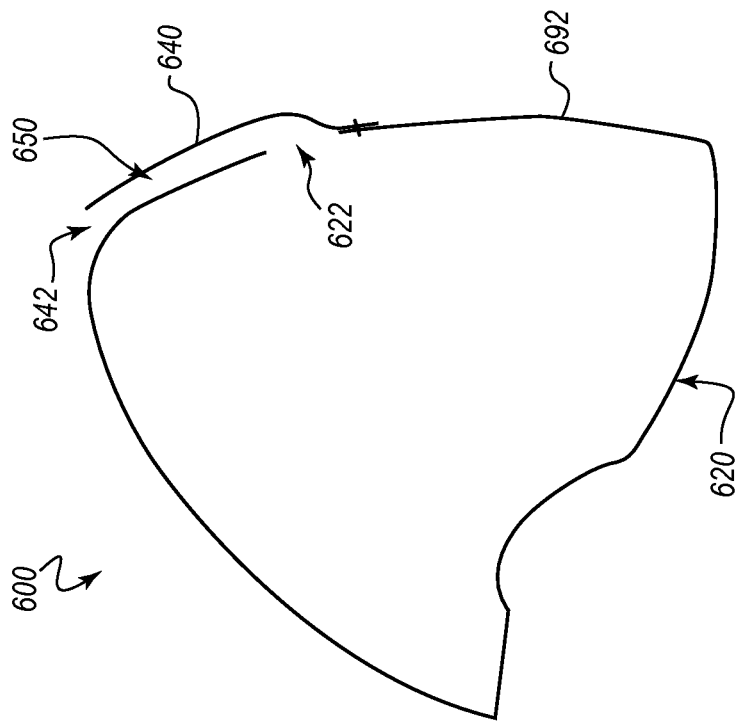
FIG. 8B is a cross-sectional side view of the airbag assembly of FIG. 8A.
Figure 8A:
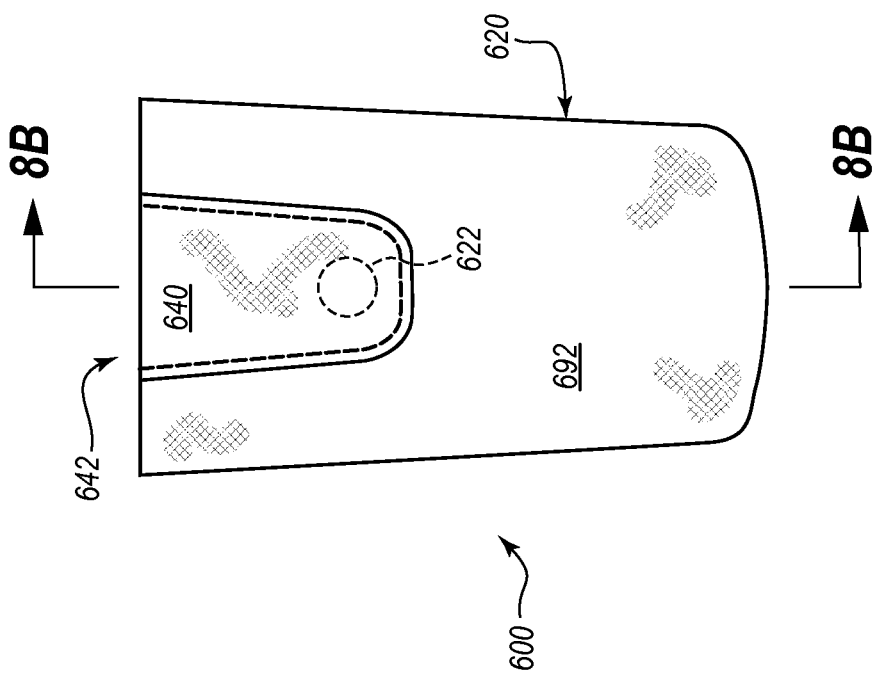
FIG. 8A is a front view of airbag assembly, according to another embodiment.

FIGS. 8A and 8B depict an airbag assembly 600, according to another embodiment. More particularly, FIG. 8A provides a front view of the airbag assembly 600 while FIG. 8B provides a cross-sectional view of the airbag assembly of FIG. 8A.

As depicted in FIGS. 8A and 8B, the airbag assembly 600 includes an airbag cushion 620 and an outer panel 640. The airbag cushion 620 may include a front panel 692 that is substantially U-shaped to direct gas in an upward direction. As depicted in FIGS. 8A and 8B, the front panel 692 may have only a single vent 622. The outer panel 640 may be attached or otherwise coupled to the airbag cushion 640 to form a channel 650 that is configured to direct air from the vent 622 and out of the airbag assembly 600. For example, the outer panel 640 may be attached to a front panel 692 of the airbag cushion 620 in any suitable manner (e.g., adhesive, stitching, etc.). For example, the outer panel 640 may be attached to the airbag cushion 620 by stitching that extends around three sides (e.g., the left, right, and bottom) of the outer panel 640. Because no stitching, adhesive, etc. extends along the entire length of the upper edge of the outer panel 640, the airbag cushion 620 and outer panel 640 combine to form an upper opening 642.

Thus, inflation gas may pass from the airbag cushion 620 through the single vent 622 and into the channel 650 formed by the outer panel 640 and the airbag cushion 620. The channel 650 may then direct inflation gas away from the vent in an upward direction into the cabin of a vehicle.

Figure 9A:
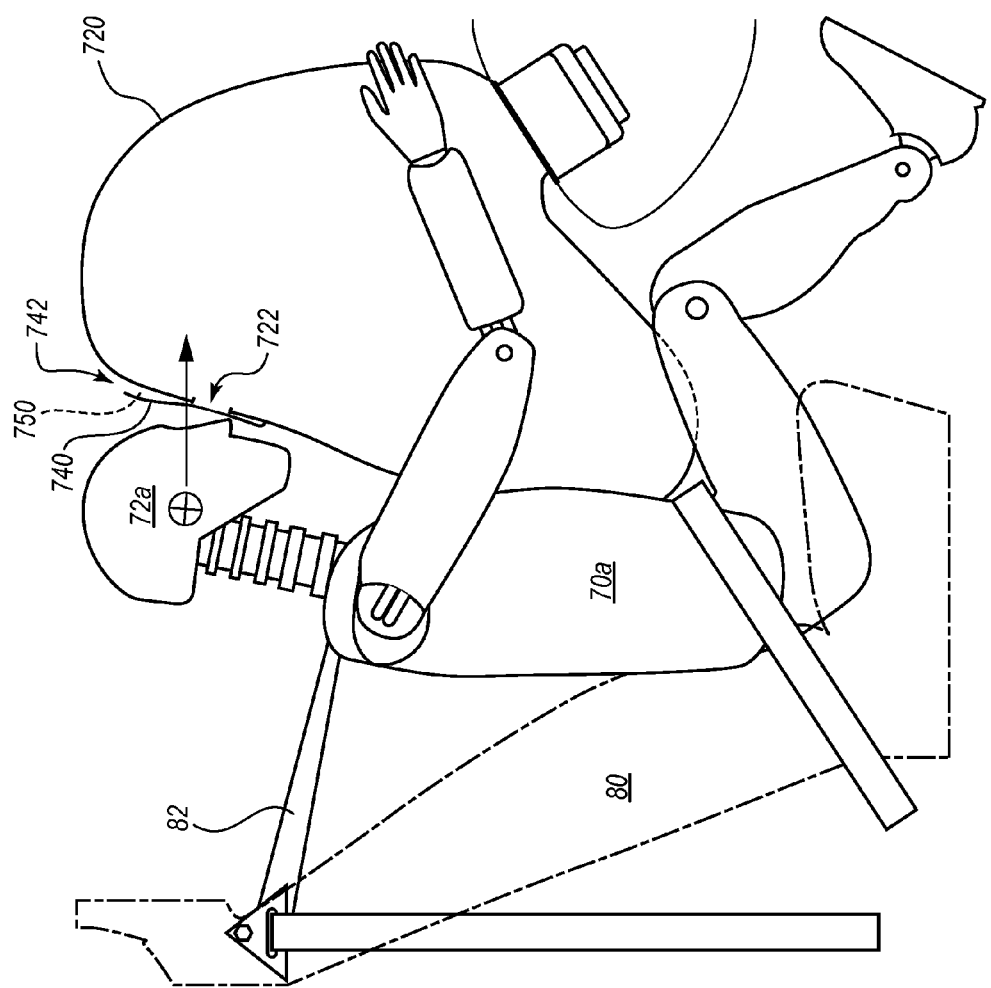
FIG. 9A is a partially cut-away side view of an airbag assembly, according to another embodiment, and a first front seat occupant impacting the airbag assembly during a collision event.
Figure 9B:
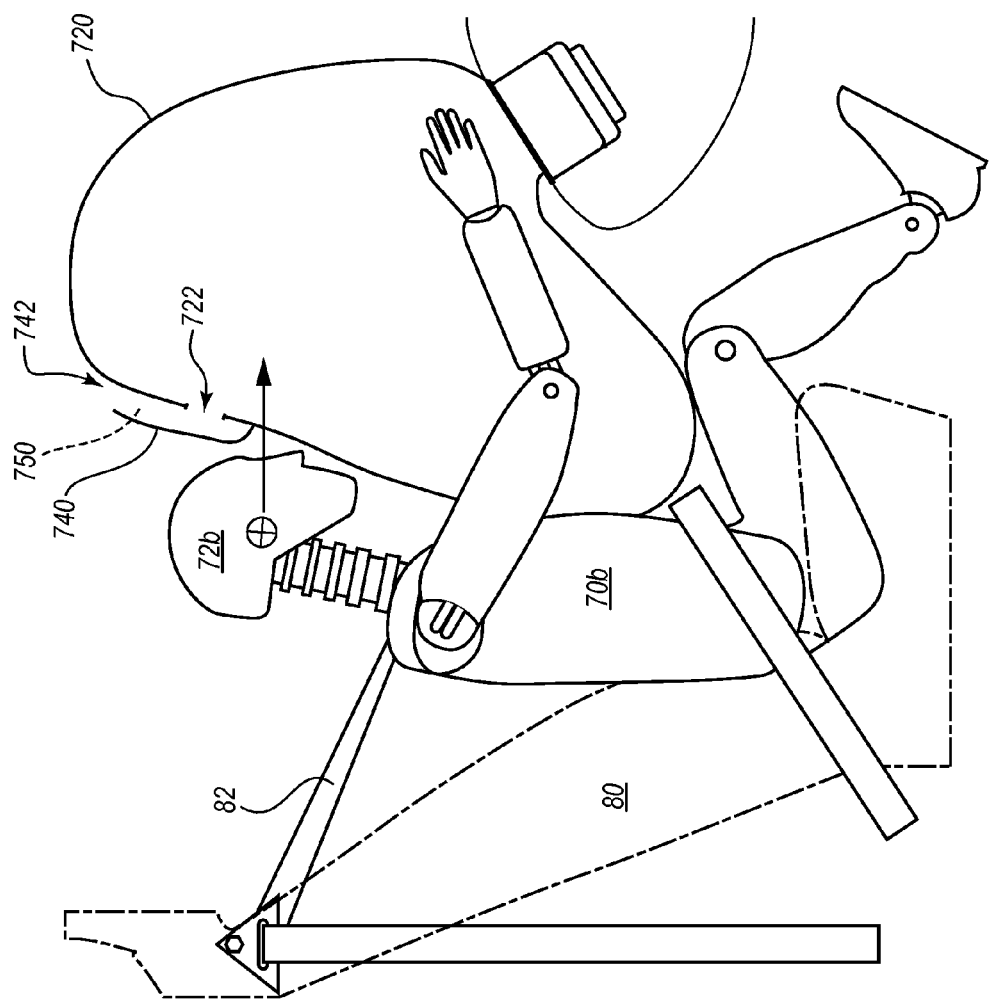
FIG. 9B is a partially cut-away side view of the airbag assembly of FIG. 9A and a second front seat occupant impacting the airbag assembly during a collision event.

FIGS. 9A and 9B provide partially cut-away side views of a first and second front-seat occupant and an airbag assembly 700 during a collision event. More particularly, FIG. 9A depicts a relatively tall front-seat occupant 70a contacting the airbag assembly 700, while FIG. 9B depicts a relatively short front-seat occupant contacting the airbag assembly 700.

The airbag assembly 700 may resemble the airbag assembly 600 described above in connection with FIGS. 8A and 8B in many respects. For example, the airbag assembly 700 may include an airbag cushion 720, a outer panel 740, and a channel 750 that directs air away from a single vent 722 in an upward direction into the cabin of vehicle.

The airbag assembly 700 may be configured to provide adaptive venting in a passive manner. In other words, the airbag assembly 700 may be configured to modulate the venting capacity of the airbag assembly 700 without input from one or more electrical sensors. For example, the airbag assembly 700 may be configured to modulate the venting capacity of the airbag assembly 700 based on whether the occupant's head 72a, 72b causes the vent 722 to be obstructed by the outer panel 740. Thus, the airbag assembly 700 may provide adaptive venting when deployed by using only a single-stage inflator. In other embodiments, the airbag assembly may comprise other vents, such as discrete vents, that are not covered by an outer panel.

As shown in FIG. 9A, a first (e.g., tall) occupant 70a may move forward during a collision event such that the occupant's head 72 strikes the outer panel, thereby forcing the outer panel toward the vent 722. Such contact with the outer panel 740 may obstruct the flow of air through the vent 722, causing the airbag assembly 700 to have a relatively low venting capacity.

In contrast, in FIG. 9B, the shorter occupant 70b strikes the airbag assembly 700 at a region that is lower than the region at which the larger occupant 70a contacted the airbag assembly 700. For example, during a collision event that is essentially identical to the one depicted in FIG. 9A, the shorter occupant's head 72b may strike the airbag assembly 700 below the vent 722, leaving the vent 722 largely unobstructed. Because such contact does not obstruct the flow of air through the vent 722, the airbag assembly 700 may have a relatively high venting capacity.

Figure 10:
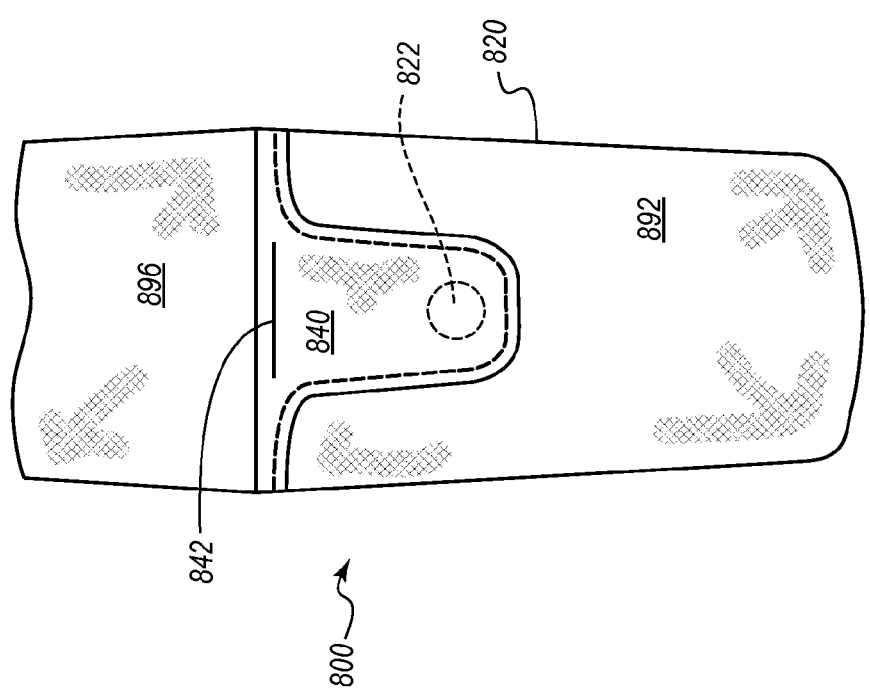
FIG. 10 is a front view of an airbag assembly, according to another embodiment.

FIG. 10 provides a perspective view of an airbag assembly 800 as viewed by an observer positioned rearward and above of the airbag assembly 800. The airbag assembly 800 may include a front panel 892, an outer panel 840, and an upper panel 896. As depicted in FIG. 10, the upper panel 896 and outer panel 840 may be integrally formed. In other words, a single piece of material may include both an upper panel 896 (i.e., a panel facing in a generally upward direction upon deployment) and an outer panel 840 configured to cover one or more vents (e.g., vent 822). The outer panel 840 and the front panel 892 may define, at least in part, a channel. For example, the outer panel 840 may be stitched or otherwise coupled to the airbag cushion 820 to form a channel. The outer panel 840 may include a slit or opening 842 through which inflation gas inside the channel may exit to enter into the cabin of a vehicle during a deployment event.

Figure 11:
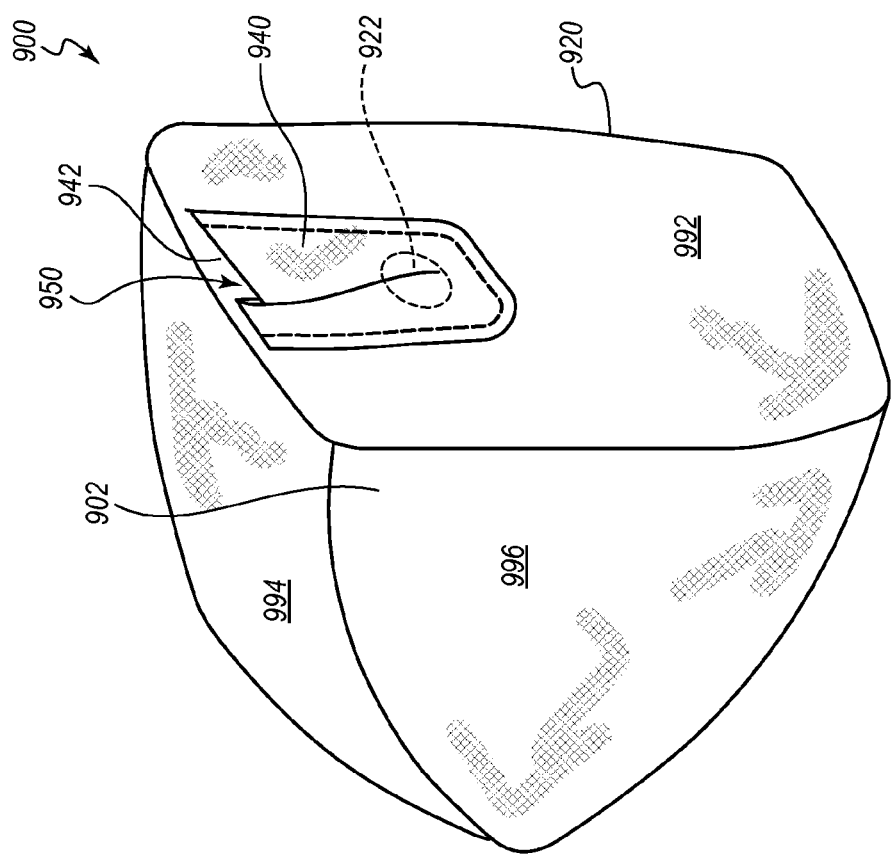
FIG. 11 is a perspective view of an airbag assembly, according to another embodiment.

FIG. 11 provides a perspective view of an airbag assembly 900 comprising an airbag cushion 920 and an outer panel 940. As depicted, the airbag assembly 900 may include a front panel 992 and one or more other panels (e.g., upper panel 994, and side panel 996). The front panel 992 may attached to one or more other panels (e.g., upper panel 994 and side panel 996). The outer panel 940 may be attached or otherwise coupled to the front panel 992 of the airbag assembly 900. The outer panel 940 may cover one or more vents 922 and be attached to the front panel 992 such that the outer panel 940 includes enough slack to form a channel 950 through which inflation gas may pass. The outer panel 940 may be attached to the airbag cushion 920 via stitching that extends along a left, bottom, and right side of the outer panel 940. However, in some embodiments, the stitching does not extend along the top edge of the outer panel 940, thereby providing an opening 942 through which air may exit from the channel 950 into the external environment during a deployment event.

Initially the outer panel 940 may include a fold or crease to reduce slack in the outer panel 940 and limit or delay the channel 950 from forming. Thus, the outer panel 940 may initially obstruct the one or more vents 922 until the air bag cushion 920 is partially or fully inflated. Once air pressure within the air bag cushion 920 reaches a threshold level, and forces air out the vent 922, the outer panel 940 may unfold to release slack and form the channel 950 to direct inflation gas away from the vent 922 and out the opening 942 away from an occupant.

Figure 12:
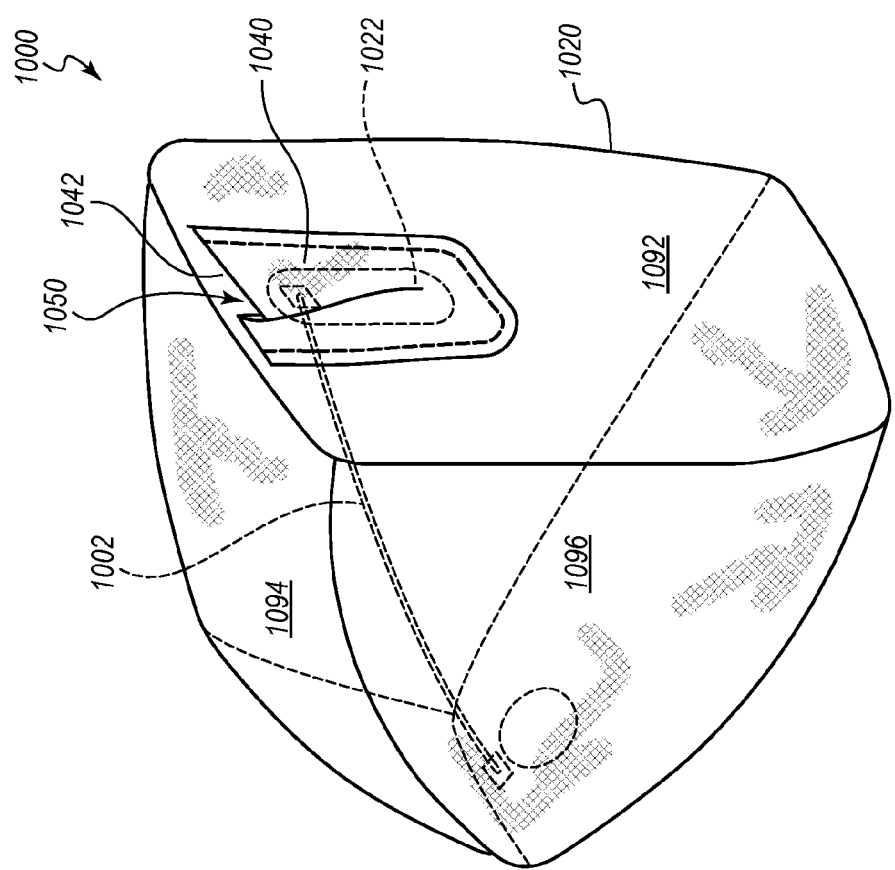
FIG. 12 is a perspective view of an airbag assembly, according to another embodiment.

FIG. 12 provides a perspective view of an airbag assembly 1000 that comprises an airbag cushion 1020 and an outer panel 1040. Like the airbag assembly 900 depicted in FIG. 11, the airbag assembly 1000 may include a front panel 1092 and one or more other panels (e.g., upper panel 1094, and side panel 1096). The front panel 1092 may be attached to one or more other panels (e.g., upper panel 1094 and side panel 1096). The outer panel 1040 may be attached or otherwise coupled to the front panel 1092 of the airbag assembly 1000. The outer panel 1040 may cover one or more vents 1022 and be attached to the front panel 1092 such that the outer panel 1040 includes enough slack to form a channel 1050 through which inflation gas may pass. The outer panel 1040 may be attached to the airbag cushion 1020 via stitching that extends along a left, bottom, and right side of the outer panel 1040 in a U-shaped fashion.

The vent 1022 may be shaped in an elongate fashion. For example, the vent 1022 may be substantially oval in shape and oriented such that the length of the oval is vertically oriented. In other embodiments, one or more elongate vents may be horizontally oriented. As an occupant strikes the outer panel 1040 of the airbag assembly 1000, the venting capacity of the airbag assembly 1000 may depend on where the occupant strikes the outer panel 1040. For example, if an occupant strikes the outer panel 1040 such that the outer panel 1040 obstructs the elongate vent 1022 along its entire length, the venting capacity of the airbag assembly 1000 may be decreased to a greater degree than if the occupant were to strike the outer panel 1040 such that outer panel 1040 obstructs only a lower portion of the elongate vent 1022.

The airbag assembly 1000 may also comprise a tether 1002 that extends from an interior surface of an airbag cushion panel to the outer panel 1040. For example, the tether 1002 may include a first end that is attached to an interior surface of a panel disposed near the dashboard and a second end that is attached to the inside of the outer panel 1040. As the airbag cushion 1020 expands, the tether 1002 may draw the outer panel 1040 toward the vent 1022, thereby obstructing the flow of inflation gas out of the airbag cushion 1020. As an occupant strikes the airbag assembly 1000, the occupant's head may push the outer panel 1040 in a forward direction, thereby shortening the distance between the ends of the tether 1002. When the distance between the ends of the tether 1002 are shortened in this manner, the tether 1002 can become slack, thereby permitting the outer panel 1040 to move away from the front panel 1092 and obstruct the vent 1022 to a lesser degree. In this manner, inflation gas may be more fully retained within the airbag cushion 1020 prior to the occupant's contact with the airbag assembly 1000. Such retention may decrease the amount of inflation gas needed to deploy of the airbag assembly 1000 relative to embodiments that lack such a tether.

As can be appreciated, any of the features of any of the previously described embodiments may be combined with the features of any other embodiment. For example, any of the previously described embodiments have vents of varying shapes (e.g., an elongated vent as shown in FIG. 12), number, size, and alignment. As a further example, any of the previously described embodiments may comprise a tether (e.g., as shown in FIG. 12) to draw the outer panel toward the vents and close the channel.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure, that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An airbag assembly comprising:
   an airbag cushion configured to deploy in a generally rearward direction to cushion an occupant during a collision event, the airbag cushion comprising one or more vents to allow air to pass out of the airbag cushion; and
   an outer panel coupled to the airbag cushion to receive air that is directed out the airbag cushion through the one or more vents during deployment of the airbag assembly and direct the air away from the one or more vents and into a cabin of a vehicle, and
   a tether comprising a first end and a second end, wherein the first end is attached to the outer panel and the second end is attached to an interior surface of the airbag cushion;
   wherein the outer panel is configured to attenuate the rate of air flow out of the one or more vents during a collision event based on where the front-seat occupant strikes the outer panel.

2. The airbag assembly of claim 1, further comprising a single-stage inflator.

3. The airbag assembly of claim 1, wherein the one or more vents comprises multiple vents.

4. The airbag assembly of claim 3, wherein the multiple vents are vertically aligned.

5. The airbag assembly of claim 1, wherein, upon deployment, the airbag assembly attenuates the rate of air flow to a greater extent when an occupant strikes an upper region of the outer panel than when the occupant strikes a lower region of the outer panel.

6. The airbag assembly of claim 1, wherein the airbag cushion is a front airbag.

7. The airbag assembly of claim 1, wherein, upon deployment, the outer panel forms a channel that is one of T-shaped or Y-shaped.

8. The airbag assembly of claim 1, wherein the airbag cushion comprises a rearward-facing panel configured to receive an occupant, the rearward-facing panel comprising the one or more vents.

9. An airbag assembly comprising:
   an airbag cushion configured to cushion a front-seat occupant who moves in a generally forward direction during a collision event, the airbag cushion comprising one or more vents configured to direct air out of the airbag cushion; and
   an outer panel coupled to the airbag cushion;
   wherein, upon deployment of the airbag assembly, a vertical portion of the outer panel receives air from the one or more vents of the airbag cushion and directs the air vertically relative to the airbag cushion to one or more lateral portions of the outer panel that direct the air in a generally lateral direction away from the one or more vents and into the cabin of a vehicle; and
   wherein the airbag assembly is configured such that an interaction between the head of a front-seat occupant and the airbag assembly during a collision event causes the outer panel to partially or completely obstruct at least one of the one or more vents.

10. The airbag assembly of claim 9, further comprising a single-stage inflator.

11. The airbag assembly of claim 9, wherein the one or more vents comprises multiple vents.

12. The airbag assembly of claim 11, wherein the multiple vents are vertically aligned.

13. The airbag assembly of claim 9, wherein the outer panel obstructs a greater area of the one or more vents when the head of the front-seat occupant strikes an upper region of the outer panel than when the head of the front-seat occupant strikes a lower region of the outer panel.

14. The airbag assembly of claim 9, wherein
   the one or more vents comprise a first set of vents disposed below a horizontal plane and a second set of vents disposed above the horizontal plane; and
   the first set of vents comprises a first number of vents and the second set comprises a second number of vents, the first number of vents and second number of vents differing in number or size.

15. The airbag assembly of claim 9, further comprising a tether, wherein the tether comprises a first end that is attached to the outer panel and a second end that is attached to an interior surface of the airbag cushion.

16. An airbag assembly comprising:
an inflator;
an airbag cushion comprising one or more vents that are configured to vent air out of the airbag cushion, wherein the airbag cushion is configured to
receive inflation gas from the inflator and thereby expand from a compact state to a deployed state; and
cushion a head of an occupant who moves in a generally forward direction during a deployment event; and
a T-shaped or Y-shaped outer panel coupled to the airbag cushion to receive air from the one or more vents of the airbag cushion and direct the air away from the one or more vents and away from the occupant;
wherein the airbag assembly is configured to modulate its venting capacity without input from an electrical sensor and based on interaction with the occupant.

17. The airbag assembly of claim 16, wherein the airbag assembly is configured to modulate the venting capacity of the airbag assembly based on whether and where the front-seat occupant strikes the outer panel.

18. The airbag assembly of claim 16, wherein the airbag assembly is configured to provide increased venting when an occupant strikes a lower region of the airbag assembly than when an occupant strikes a higher region of the airbag assembly.

19. The airbag assembly of claim 16, wherein
the airbag cushion comprises:
a rear panel that, upon deployment of the airbag assembly, comprises a rearward-facing surface configured to receive the head of a front seat occupant; and
one or more side panels,
wherein the rearward-facing surface of the panel comprises the one or more vents.

20. The airbag assembly of claim 16, wherein the one or more vents comprises multiple vents that are vertically aligned.

21. The airbag assembly of claim 16, wherein the outer panel modulates the venting capacity by at least partially obstructing the one or more vents in response to the occupant striking a region of the outer panel, and
wherein the outer panel is configured to attenuate a rate of air flow to a greater extent if the occupant strikes an upper region of the outer panel than if the occupant strikes a lower region of the outer panel.

22. The airbag assembly of claim 16, further comprising a tether, wherein the tether comprises a first end that is attached to the outer panel and a second end that is attached to an interior surface of the airbag cushion.

* * * * *